(12) United States Patent
Yun et al.

(10) Patent No.: US 9,727,144 B2
(45) Date of Patent: Aug. 8, 2017

(54) 3D INTERACTION APPARATUS, DISPLAY DEVICE INCLUDING THE SAME, AND METHOD OF DRIVING THE SAME

(71) Applicant: Samsung Electronics Co., Ltd., Suwon-si (KR)

(72) Inventors: Youngjun Yun, Seongnam-si (KR); Young-eal Kim, Hwaseong-si (KR); Jesada Ungnapatanin, Suwon-si (KR); Hoon Song, Yongin-si (KR); Hong-seok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 14/272,121

(22) Filed: May 7, 2014

(65) Prior Publication Data
US 2015/0102997 A1    Apr. 16, 2015

(30) Foreign Application Priority Data

Oct. 14, 2013   (KR) .......................... 10-2013-0122216

(51) Int. Cl.
*G06F 3/01*   (2006.01)

(52) U.S. Cl.
CPC .................................. *G06F 3/017* (2013.01)

(58) Field of Classification Search
CPC ........... G06F 3/017; G06F 3/01; G06F 3/0346

USPC ...... 345/32, 156–179; 359/228, 665; 349/62
See application file for complete search history.

(56) References Cited

U.S. PATENT DOCUMENTS

| | | | |
|---|---|---|---|
| 7,224,384 B1 | 5/2007 | Iddan et al. | |
| 8,355,209 B2 | 1/2013 | Tsuji et al. | |
| 2011/0299728 A1* | 12/2011 | Markovic | G06T 7/0042 382/103 |
| 2012/0146902 A1 | 6/2012 | Adermann et al. | |
| 2013/0116049 A1 | 5/2013 | Pellman et al. | |

FOREIGN PATENT DOCUMENTS

| | | | |
|---|---|---|---|
| JP | 2004320286 A | * | 11/2004 |
| KR | 10-0797676 B1 | | 1/2008 |
| KR | 10-2009-0125933 A | | 12/2009 |

* cited by examiner

*Primary Examiner* — Amare Mengistu
*Assistant Examiner* — Stacy Khoo
(74) *Attorney, Agent, or Firm* — Sughrue Mion, PLLC

(57) ABSTRACT

Provided are a three-dimensional (3D) interaction apparatus capable of recognizing a user's motions in a 3D space for performing a 3D interaction function, a display device including the 3D interaction apparatus, and a method of driving the 3D interaction apparatus. The 3D interaction apparatus includes a depth camera which obtains a depth image including depth information of a distance between an object and the depth camera; an active optical device disposed in front of the depth camera and configured to adjust a propagation path of light by refracting incident light so as to adjust a field of view of the depth camera; and a driving unit which controls operation of the active optical device.

14 Claims, 7 Drawing Sheets

3D INTERACTION APPARATUS, DISPLAY DEVICE INCLUDING THE SAME, AND METHOD OF DRIVING THE SAME

CROSS REFERENCE TO RELATED APPLICATION

This application claims priority from Korean Patent Application No. 10-2013-0122216, filed on Oct. 14, 2013, in the Korean Intellectual Property Office, the disclosure of which is incorporated herein in its entirety by reference.

BACKGROUND

1. Field

Apparatuses and methods consistent with exemplary embodiments relate to a three-dimensional (3D) interaction apparatus, a display device including the 3D interaction apparatus, and a method of driving the 3D interaction apparatus, and more particularly, to a 3D interaction apparatus capable of recognizing user motions in a 3D space for performing a 3D interaction function, a display device including the 3D interaction apparatus, and a method of driving the 3D interaction apparatus.

2. Description of the Related Art

As methods of displaying 3D images, glasses methods and non-glasses methods are widely used. Examples of glasses methods include polarized glasses methods and shutter glasses methods, and examples of non-glasses methods include lenticular methods and parallax barrier methods. Such methods use binocular parallax and are limited in increasing the number of viewpoints. In addition to this, these methods make viewers feel tired due to the difference between the depth which the brain perceives and the focus of the eyes. Furthermore, such methods only provide horizontal parallax but not vertical parallax.

Recently, holographic methods have been developed and put in to use, providing 3D image display methods capable of making the depth which the brain perceives consistent with the focus of the eyes and providing full parallax. For example, technology is being developed for displaying 3D images by using holograms at a position close to a user on a small display device such as a cellular phone or a laptop computer.

In addition, 3D user interfaces capable of providing 3D interaction between a user and a 3D image display device, as well as displaying 3D images, are becoming important. For example, various 3D user interface techniques have been developed to allow users to rotate, contract, or expand a 3D image, or select a particular region or menu. Generally, such 3D user interface techniques use depth cameras to recognize a part of a user's body, such as the user's face or a finger, and trace motions thereof. Depth cameras capture images containing information about the distance from the object instead of color information such as RGB information. For example, depth cameras may extract distance information by a time-of-flight (TOF) method.

SUMMARY

Additional aspects will be set forth in part in the description which follows and, in part, will be apparent from the description, or may be learned by practice of the presented embodiments.

According to an aspect of an exemplary embodiment, a 3D interaction apparatus includes: a depth camera which obtains a depth image including depth information on a distance between an object and the depth camera; an active optical device disposed in front of the depth camera and configured to adjust a propagation path of light incident thereon by refracting the light so as to adjust a field of view of the depth camera; and a driving unit to control operation of the active optical device for adjusting a refracting direction of light.

The depth camera may generate the depth image using a time-of-flight (TOF) method to obtain the depth information of the object for each of a plurality of pixels of the depth image.

The active optical device may be an electrowetting prism configured to adjust a propagation path of light by refracting the light according to electric control.

The active optical device may include: first and second transparent substrates facing each other; a sidewall surrounding a space between the first and second transparent substrates; a plurality of electrodes arranged along an inner surface of the sidewall to face each other; a hydrophobic layer covering the electrodes; and a nonpolar liquid and a polar liquid disposed between the first and second transparent substrates.

The active optical device may adjust the field of view of the depth camera to maintain the object within the field of view of the depth camera.

The 3D interaction apparatus may further include: a color camera which obtains a color image; an image processing unit which processes the depth image and the color image to extract depth and shape information of the object, respectively; and a control unit to control the driving unit by using the information extracted using the image processing unit.

The 3D interaction apparatus may further include an additional active optical device, disposed in front side of the color camera, which adjusts a field of view of the color camera.

According to an aspect of another exemplary embodiment, a display device includes a 3D interaction apparatus as an input apparatus, wherein the 3D interaction apparatus includes: a depth camera which obtains a depth image including depth information of a distance between an object and the depth camera; an active optical device disposed in front of the depth camera and configured to adjust a propagation path of light incident thereon by refracting the light, thereby adjusting a field of view of the depth camera; and a driving unit which controls operation of the active optical device.

The display device may be a holographic display device.

According to an aspect of another exemplary embodiment, a method of driving a 3D interaction apparatus may include: recognizing a predetermined pattern in a color image obtained using a color camera; tracing a motion of the predetermined pattern; operating an active optical device, disposed in front of a depth camera, to adjust a propagation path of light, so as to maintain the predetermined pattern within a field of view of the depth camera; and determining the motion of the predetermined pattern in a space for 3D interaction and a distance between the predetermined pattern and the depth camera.

The pattern may be a hand shape or a finger shape of a person.

The tracing of the motion of the pattern may be performed using a color image captured by the color camera and a depth image captured by the depth camera.

The operating of the active optical device may include changing the field of view of the depth camera to maintain the predetermined within the field of view of the depth camera.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
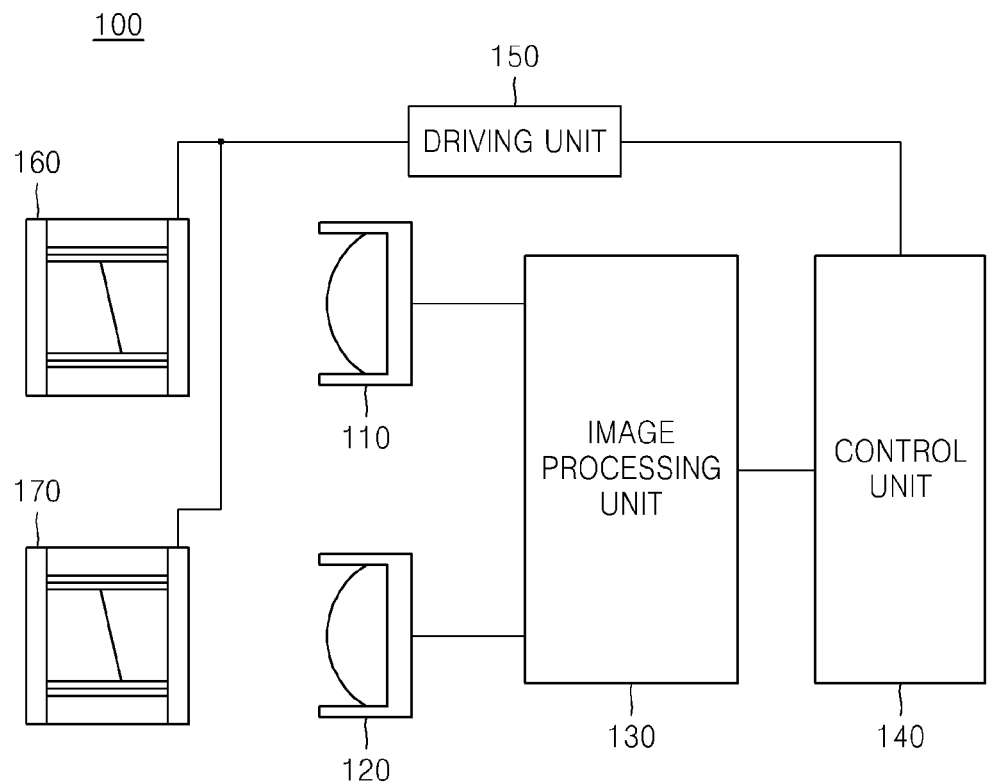
FIG. 1 is a conceptual view of the configuration of a 3D interaction apparatus according to an exemplary embodiment.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a 3D interaction apparatus, a display device including a 3D interaction apparatus, and a method of driving a 3D interaction apparatus will be described with reference to the accompanying drawings. In the drawings, the size of each component may be exaggerated for clarity of illustration. The following embodiments are exemplary, and various changes in form and details may be made therein. It will also be understood that when a layer is referred to as being "above" or "on" another layer or substrate, it may be directly on the other layer or substrate or be above the layer or substrate without making contact with the layer or substrate.

FIG. 1 is a conceptual view of a 3D interaction apparatus 100 according to an exemplary embodiment. Referring to FIG. 1, the 3D interaction apparatus 100 of the current embodiment may include: a depth camera 110 to obtain a depth image including information on a distance between the camera and an object; an active optical device 160 configured to adjust the propagation path of light by refracting the light for adjusting the field of view (FOV) of the depth camera 110; and a driving unit 150 configured to control the operation of the active optical device 160 for adjusting the refraction direction of light.

The depth camera 110 obtains information about the distance between the camera and an object in a space for 3D interaction. For example, according to a time-of-flight (TOF) method, the depth camera 110 may emit infrared rays having a wavelength of about 850 nm to an object and extract distance information by measuring the TOF of infrared rays reflected from the object back to the depth camera 110. That is, each pixel of a depth image provided by the depth camera 110 has distance information on a corresponding region of the object.

Generally, the angle of view of the depth camera 110 is narrow, at about 60°, as compared with the angles of view of typical cameras. Therefore, if a 3D interaction space is close to the depth camera 110, an object may be out of the field of view (FOV) of the depth camera 110. That is, a blind region may be present in a close 3D interaction space. A plurality of depth cameras 110 may be used to minimize the blind region. In this case, however, the blind region still exists, and the size and manufacturing cost of the whole system increase.

Figure 2:
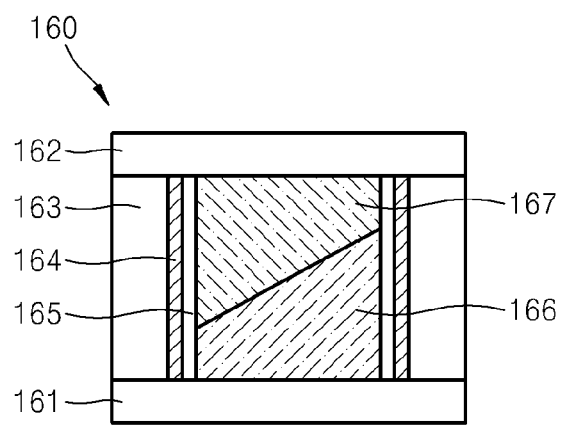
FIG. 2 is a schematic sectional view of the structure of an active optical device illustrated in FIG. 1.

The active optical device 160 is disposed in front of the depth camera 110 to adjust the field of view of the depth camera 110 in order to remove the blind region. For this, the active optical device 160 is configured to adjust the propagation path of light by refracting the light according to electric control. For example, the active optical device 160 may be an electrowetting prism having a light-refracting surface whose angle is adjustable by electrowetting. FIG. 2 is a schematic sectional view of the structure of the active optical device 160.

Referring to FIG. 2, the active optical device 160 may include: first and second transparent substrates 161 and 162 facing each other; a sidewall 163 surrounding a space between the first and second transparent substrates 161 and 162; a plurality of electrodes 164 arranged along an inner surface of the sidewall 163 to face each other; a hydrophobic layer 165 covering the electrodes 164; and a nonpolar liquid 166 and a polar liquid 167 disposed in the internal space defined by the first and second transparent substrates 161 and 162 and the sidewall 163. The nonpolar liquid 166 and the polar liquid 167 may have a high transmittance for transmitting light substantially without loss and may have different refractive indexes so that light is refracted at the interface therebetween. In addition, the density of the nonpolar liquid 166 may be greater than that of the polar liquid 167 so that the nonpolar liquid 166 may be disposed under the polar liquid 167. In the vertical sectional view of FIG. 2, only two electrodes 164 are shown. However, if the active optical device 160 has a tetragonal cross-section, the active optical device 160 may include four electrodes 164.

In the active optical device 160 having an electrowetting prism structure, the interface between the nonpolar liquid 166 and the polar liquid 167 may be substantially horizontal (i.e., perpendicular to an optical axis) or may be inclined according to voltages applied to the plurality of electrodes 164. If the interface between the nonpolar liquid 166 and the polar liquid 167 is horizontal, light incident on the active optical device 160 along an optical axis may pass through the active optical device 160 without refraction. That is, the propagation direction of the light is not changed. However, if the interface between the nonpolar liquid 166 and the polar liquid 167 is inclined with respect to the optical axis, light incident on the active optical device 160 along the optical axis may be refracted at the interface between the nonpolar liquid 166 and the polar liquid 167. Therefore, the active optical device 160 may change the propagation direction of light incident thereon according to electric control.

Figure 3A:
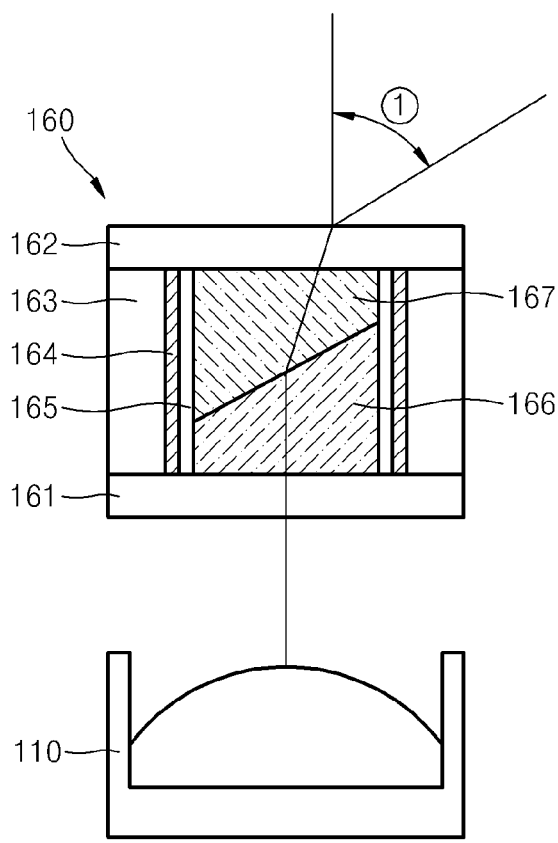
FIGS. 3A to 3C are schematic views of operation of the active optical device and variations of the field of view of a depth camera illustrated in FIG. 1.
Figure 3B:
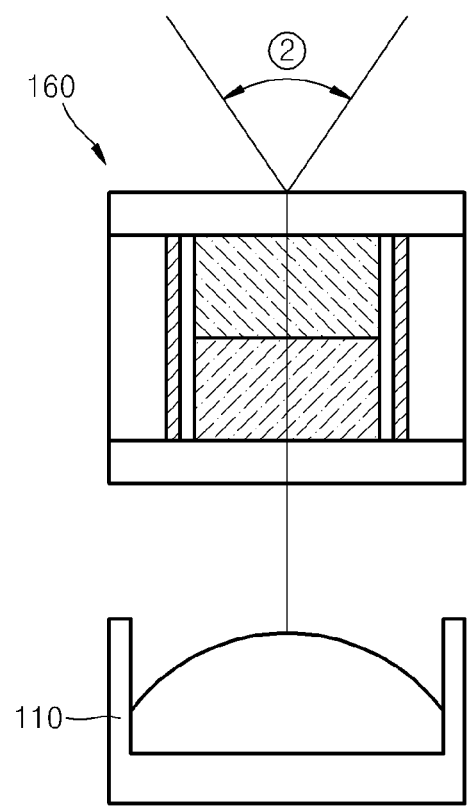
Figure 3C:
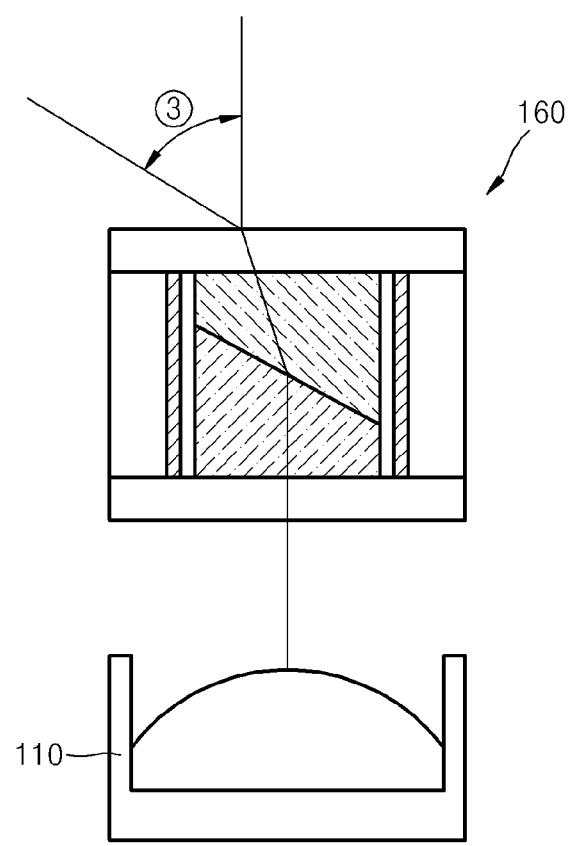

Based on the principle described above, the active optical device 160 may adjust the field of view of the depth camera 110, as desired. For example, FIGS. 3A to 3C illustrate operation of the active optical device 160 and variations of the field of view of the depth camera 110. Referring to FIG. 3A, the interface between the nonpolar liquid 166 and the polar liquid 167 is inclined toward the right. In this case, light is refracted to the right, and the field of view of the depth camera 110 is shifted towards the right to a region denoted by ①. In addition, referring to FIG. 3B, the interface between the nonpolar liquid 166 and the polar liquid 167 is horizontal, and in this case, the field of view of the depth camera 110 may be towards a front region denoted by ②. Referring to FIG. 3C, the interface between the nonpolar liquid 166 and the polar liquid 167 is inclined toward the left. In this case, light is refracted to the left, and the field of view of the depth camera 110 is shifted towards the left to a region denoted by ③. Therefore, although only a single depth camera 110 is used, regardless of the angle of view of the depth camera 110, a blind region may be removed by using the active optical device 160.

In addition, as shown in FIG. 1, the 3D interaction apparatus 100 may further include: a color camera 120 to obtain color images of an object; an image processing unit 130 to extract shape and depth information of an object by processing depth images obtained through the depth camera 110 and color images obtained through the color camera 120; and a control unit 140 to control the driving unit 150 based on the information extracted using the image processing unit 130. Furthermore, the 3D interaction apparatus 100 may further include an active optical device 170 disposed at a front side of the color camera 120 to control the field of view of the color camera 120. However, if the field of view of the color camera 120 is sufficient, the active optical device 170 may be omitted.

Figure 4:
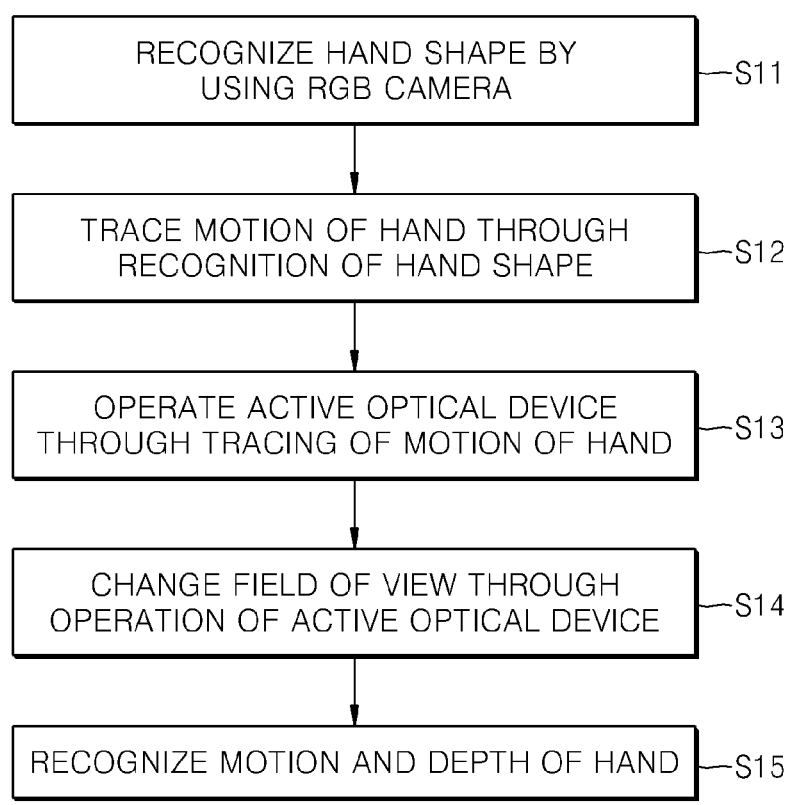
FIG. 4 is a flowchart of a method of driving the 3D interaction apparatus illustrated in FIG. 1.

The 3D interaction apparatus 100 may recognize a motion of an object or a part of an object (for example, a hand or finger of a person). For example, FIG. 4 is a flowchart of a method of driving the 3D interaction apparatus 100. Referring to FIG. 4, a color image is generated by capturing an image of an object in a space for 3D interaction by using the color camera 120 (operation S11). The image processing unit 130 may detect and recognize a predetermined particular pattern such as a hand or finger shape of a person using the color image.

For example, if a hand shape of a person is recognized, a motion of the hand shape may be continuously traced (operation S12). For this, the color camera 120 continuously captures color images of the object, and, at the same time, the depth camera 110 captures depth images of the object. Then, the image processing unit 130 may trace a motion of the hand shape by using the color images and the depth images.

The active optical device 160 may be operated to keep the object within the field of view of the depth camera 110 without allowing the object to exit the field of view (operation S13). For example, the control unit 140 may control the active optical device 160, using the driving unit 150, so as to keep the hand shape in a center region of the field of view of the depth camera 110. If the hand shape moves to an edge region of the field of view of the depth camera 110, the active optical device 160 may be operated to change the field of view of the depth camera 110 and thus maintain the hand shape in the field of view of the depth camera 110 (operation S14).

Through the above-described tracing, the 3D interaction apparatus 100 may recognize a motion and depth (distance) of a person's hand in the space for 3D interaction (operation S15). Like an input unit such as a mouse or touch pad, the motion recognized as described above may be used as an input unit of a device such as a computer. For example, various predetermined motion patterns may be stored in the control unit 140, and the control unit 140 may compare a recognized motion and depth of a hand with the previously stored motion patterns. If there is a coincident motion pattern, an input corresponding to the motion pattern may be provided to a device such as a computer.

For example, the 3D interaction apparatus 100 may be used as an input unit of any of various electronic devices such as cellular phones, laptop computers, display devices, and computers. Particularly, the 3D interaction apparatus 100 may be useful in a holographic display device capable of providing full parallax in a small space not larger than 50 cm.

In general, a large amount of information is calculated in order to display a hologram image, and thus a huge effort has been made to reduce the amount of information required to be calculated. Recently, much research has been conducted into small holographic display devices capable of displaying personally-enjoyable small hologram images rather than large hologram images that a lot of people may enjoy. For example, such small holographic display devices may be used in cellular phones. If the 3D interaction apparatus 100 of the current embodiment is used in a holographic display device, the holographic display device may be able to rotate, contract, or expand a holographic image, or select a particular region or menu when a user touches a particular portion of the image or makes a particular motion with his/her fingers in a 3D space in which the image is displayed.

Figure 5A:
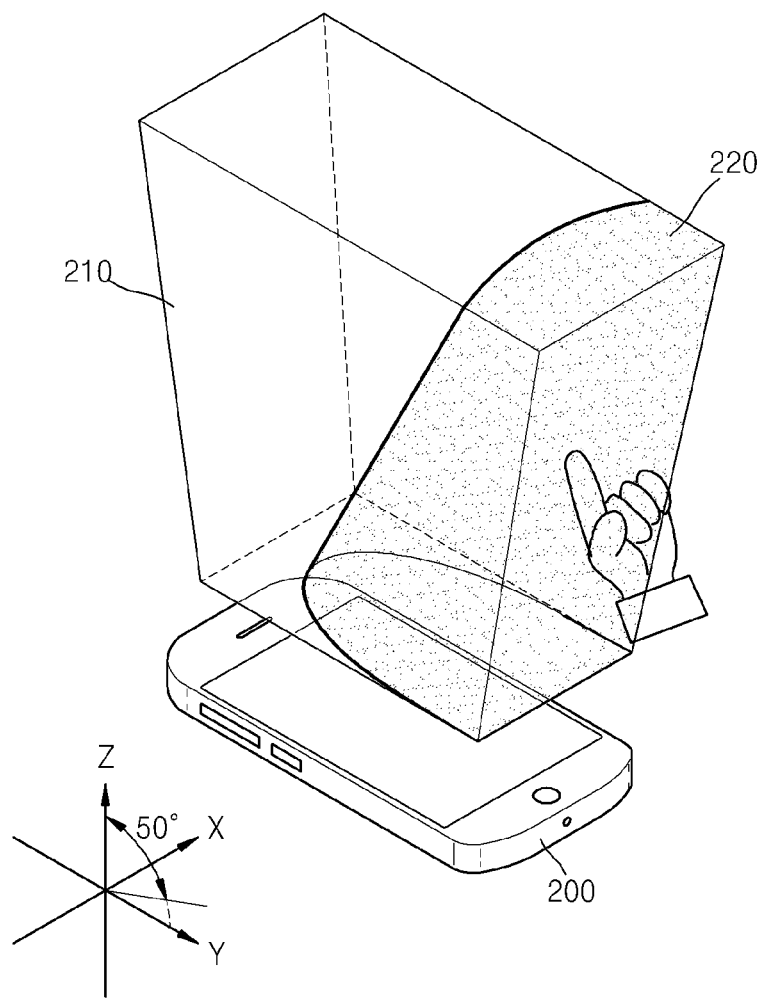
FIGS. 5A and 5B are views exemplarily illustrating a 3D interaction between a user and a display device including the 3D interaction apparatus illustrated in FIG. 1.
Figure 5B:
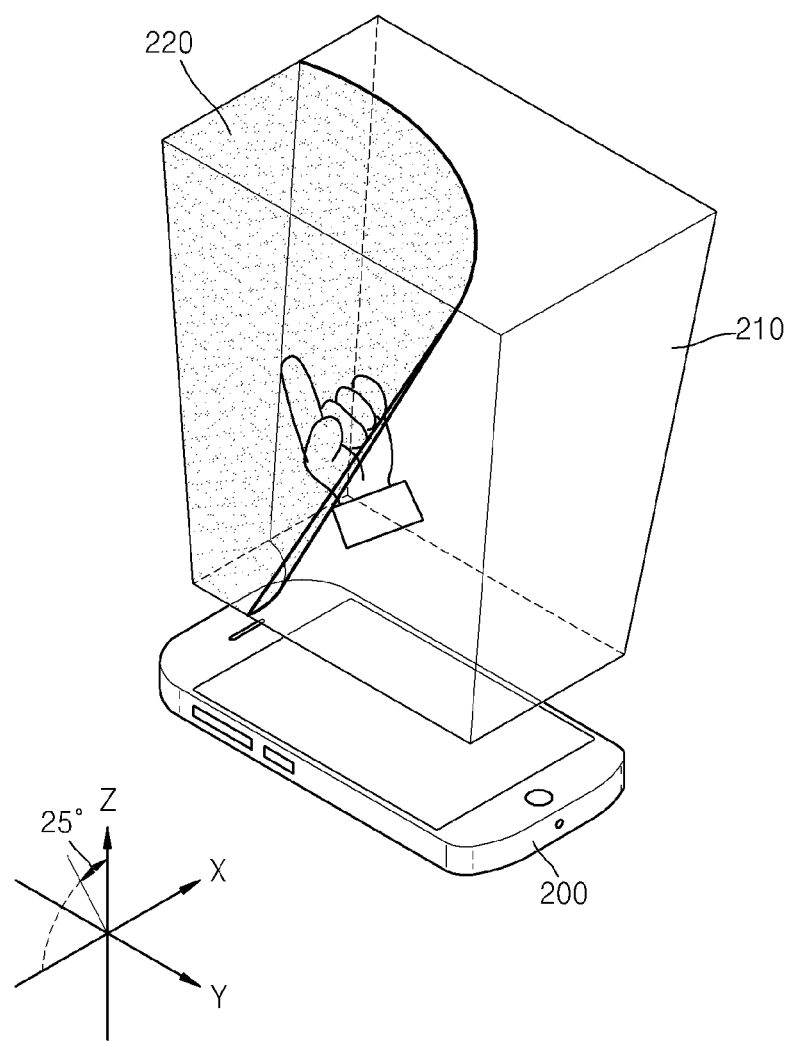

FIGS. 5A and 5B are exemplary views illustrating a 3D interaction between a user and a display device 200 including the 3D interaction apparatus 100 of the current embodiment. For example, the display device 200 may be embodied in a cellular phone. In the display device 200, a field of view 220 of the depth camera 110 may be adjusted according to the position of a finger of a user in a 3D interaction space 210. For example, referring to FIG. 5A, the active optical device 160 may adjust the slope of the interface between the nonpolar liquid 166 and the polar liquid 167 so as to refract light in a direction angled about 50° from the z-axis toward the y-axis. If the finger moves to the position shown in FIG. 5B, the active optical device 160 may adjust the slope of the interface between the nonpolar liquid 166 and the polar liquid 167 so as to refract light in a direction angled about −25° from the z-axis toward the x-axis.

The 3D interaction apparatus, the display device including the 3D interaction apparatus, and the method of driving the 3D interaction apparatus have been described according to exemplary embodiments with reference to the accompanying drawings to provide a clear understanding. However, it should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A three-dimensional (3D) interaction apparatus comprising:
   a depth camera which obtains a depth image including depth information on a distance between the depth camera and an object; and
   an active optical device disposed in front of the depth camera and configured to adjust a path of light incident thereon by refracting the light, thereby adjusting a field of view of the depth camera; and wherein the active optical device is configured to adjust a propagation path of light according to electric control, such that the field of view of the depth camera is shifted towards the object in a direction perpendicular to an optical axis via active adjustment of the active optical device, and wherein the active optical device is further configured to maintain the object in the field of view of the depth camera without allowing the object to exit the field of view of the depth camera, such that the field of view of the depth camera is adjusted to maintain the object in a center region of the field of view of the depth camera when the object moves to an edge region of the field of view of the depth camera.

2. The 3D interaction apparatus of claim 1, wherein the depth camera obtains the depth image using a time-of-flight method and obtains the depth information for each of a plurality of pixels of the depth image.

3. The 3D interaction apparatus of claim 1, wherein the active optical device is an electrowetting prism configured to adjust a propagation path of light by refracting the light according to electric control.

4. The 3D interaction apparatus of claim 3, wherein the active optical device comprises:
   a first transparent substrate;
   a second transparent substrate;
   a sidewall extending between the first transparent substrate and the second transparent substrate;
   a first electrode disposed on an inner surface of the sidewall, and a second electrode, disposed on the inner surface of the sidewall opposite the first electrode;
   a hydrophobic layer disposed on each of the first electrode and the second electrode; and
   a nonpolar liquid disposed between the first transparent substrate and the second transparent substrate; and
   a polar liquid disposed between the first transparent substrate and the second transparent substrate.

5. The 3D interaction apparatus of claim 1, further comprising:
   a color camera which obtains a color image; and
   an image processor which processes the depth image and obtains the depth information and processes the color image and obtains shape information of the object;
   wherein the active optical device adjusts the field of view of the depth camera based on the depth information and the shape information.

6. The 3D interaction apparatus of claim 5, wherein the active optical device is a first active optical device, and further comprising a second active optical device disposed in front of the color camera and configured to adjust a path of light incident thereon by refracting the light, thereby adjusting a field of view of the color camera.

7. A display device comprising:
   an input apparatus comprising a three-dimensional (3D) interaction apparatus, wherein the 3D interaction apparatus comprises:
     a depth camera which obtains a depth image including depth information on a distance between the camera and an object; and
     an active optical device disposed in front of the depth camera and configured to adjust a path of light incident thereon by refracting the light, thereby adjusting a field of view of the depth camera;
   wherein the active optical device is configured to adjust a propagation path of light according to electric control such that the field of view of the depth camera is shifted towards the object in a direction perpendicular to an optical axis via active adjustment of the active optical device, and
   wherein the active optical device is further configured to maintain the object in the field of view of the depth camera without allowing the object to exit the field of view of the depth camera, such that the field of view of the depth camera is adjusted to maintain the object in a center region of the field of view of the depth camera when the object moves to an edge region of the field of view of the depth camera.

8. The display device of claim 7, wherein the display device comprises a holographic display device.

9. A method of driving a three-dimensional (3D) interaction apparatus, the method comprising:
   recognizing a predetermined pattern in a color image obtained from a color camera;
   tracing a motion of the predetermined pattern;
   controlling an angle at which an active optical device, disposed in front of a depth camera, refracts light incident thereon, thereby maintaining the predetermined pattern within a field of view of the depth camera without allowing the predetermined pattern to exit the field of view of the depth camera, such that a field of view of the depth camera is adjusted in a direction perpendicular to an optical axis to maintain the predetermined pattern in a center region of the field of view of the depth camera when the predetermined pattern moves to an edge region of the field of view of the depth camera; and
   determining the motion of the predetermined pattern and a distance between the predetermined pattern and the depth camera,
   adjusting a propagation path of light according to electric control such that the field of view of the depth camera is shifted toward the predetermined pattern via active adjustment of the active optical device.

10. The method of claim 9, wherein the predetermined pattern comprises a hand shape or a finger shape.

11. The method of claim 9, wherein the tracing the motion of the predetermined pattern comprises using the color image obtained from the color camera and a depth image obtained from the depth camera.

12. The method of claim 9, further comprising the depth camera generating a depth image using a time of flight method, thereby obtaining depth information of a distance between the depth camera and the object for each of a plurality of pixels of the depth image.

13. The method of claim 9, wherein the active optical device is an electrowetting prism configured to adjust a propagation path of light by refracting the light according to electric control.

14. A three-dimensional (3D) interaction apparatus, comprising:
   a depth camera which obtains a depth image including depth information of a distance between an object and the depth camera;
   a color camera which obtains a color image of the object; and
   an active optical device disposed on an optical path in front of the depth camera, wherein the active optical device is configured to change an angle of refraction of light incident thereon;
   wherein the active optical device is configured to control a field of view of the depth camera to maintain the object within the field of view of the depth camera, wherein the active optical device is further configured to adjust a propagation path of light according to electric control, such that the field of view of the depth camera is shifted towards the object in a direction perpendicular to an optical axis via active adjustment of the active optical device, wherein the active optical device is configured to maintain the object in the field of view of the depth camera without allowing the object to exit the field of view of the depth camera, such that the field of view of the depth camera is adjusted to maintain the object in a center region of the field of view of the depth camera when the object moves to an edge region of the field of view of the depth camera.

\* \* \* \* \*